US009310531B2

(12) United States Patent
Kajiyama et al.

(10) Patent No.: US 9,310,531 B2
(45) Date of Patent: Apr. 12, 2016

(54) LENS AND LASER PROCESSING APPARATUS EQUIPPED WITH THE LENS

(75) Inventors: Kouichi Kajiyama, Kanagawa (JP); Makoto Hatanaka, Kanagawa (JP)

(73) Assignee: V-TECHNOLOGY CO., LTD., Kanagawa (JP)

( * ) Notice: Subject to any disclaimer, the term of this patent is extended or adjusted under 35 U.S.C. 154(b) by 152 days.

(21) Appl. No.: 14/116,602

(22) PCT Filed: May 9, 2012

(86) PCT No.: PCT/JP2012/061921
§ 371 (c)(1),
(2), (4) Date: Jan. 15, 2014

(87) PCT Pub. No.: WO2012/153785
PCT Pub. Date: Nov. 15, 2012

(65) Prior Publication Data
US 2014/0347744 A1    Nov. 27, 2014

(30) Foreign Application Priority Data

May 11, 2011   (JP) .................................. 2011-105822

(51) Int. Cl.
*G02B 3/06* (2006.01)
*C03B 33/04* (2006.01)
*C03B 33/09* (2006.01)
(Continued)

(52) U.S. Cl.
CPC .............. *G02B 3/06* (2013.01); *B23K 26/0648* (2013.01); *B23K 26/0665* (2013.01); *B23K 26/0734* (2013.01); *B23K 26/388* (2013.01); *C03B 33/04* (2013.01); *C03B 33/093* (2013.01);
(Continued)

(58) Field of Classification Search
CPC .... G02B 27/0966; G02B 27/09; G02B 13/18; G02B 3/04
USPC .................................................. 359/708, 710
See application file for complete search history.

(56) References Cited

U.S. PATENT DOCUMENTS 3,632,955 A  *  1/1972  Cruickshank et al. ..... 219/85.12
2006/0114772 A1    6/2006  Egawa et al.
2010/0084386 A1    4/2010  Masuda et al.

FOREIGN PATENT DOCUMENTS

CN  101712101 A   5/2010
JP  58-154484     9/1983
(Continued)

OTHER PUBLICATIONS

Notification of First Office Action from the State Intellectual Property Office of People's Republic of China regarding Application No. 201280022484.9, dated Sep. 16, 2014 (English-language and Chinese translation included (pp. 13)).
(Continued)

*Primary Examiner* — James Greece
(74) *Attorney, Agent, or Firm* — Finnegan, Henderson, Farabow, Garrett & Dunner LLP

(57) ABSTRACT

A member having an arbitrary shape having a closed curve can be easily subjected to laser processing within a short time. A lens and a laser processing apparatus equipped with the lens are for cutting a material to be cut into a member having an arbitrary shape having a closed curve and include a convex cylindrical lens which is molded to have a closed path so that a line that connects vertices of a cylindrical surface of the convex cylindrical lens has the same form as the arbitrary shape having the closed curve.

8 Claims, 14 Drawing Sheets

(51) Int. Cl.
  *B23K 26/06*    (2014.01)
  *B23K 26/073*   (2006.01)
  *G02B 27/09*    (2006.01)
  *B23K 26/38*    (2014.01)
  *G02B 3/00*     (2006.01)

(52) U.S. Cl.
  CPC ........ *G02B27/0927* (2013.01); *G02B 27/0966* (2013.01); *G02B 2003/0093* (2013.01)

(56) References Cited

FOREIGN PATENT DOCUMENTS

| JP | 2004-114120 | 4/2004 |
| JP | 2006-229075 | 8/2006 |
| JP | 2009-259860 | 11/2009 |
| JP | 2009-262219 | 11/2009 |
| JP | 2010-158715 | 7/2010 |
| JP | 2010-194558 | 9/2010 |
| JP | 2010-284712 | 12/2010 |
| WO | WO 2010/095744 A1 | 8/2010 |

OTHER PUBLICATIONS

Notification of the Second Office Action issued by the Chinese Patent Office in the matter of Application No. 201280022484.9; dated May 22, 2015 (both Chinese and English-language translation enclosed), (18 pgs.).

Notification of Reasons for Rejection from the Japanese Patent Office regarding corresponding Japanese Patent Application No. 2011-105822, mailed Jul. 28, 2015 (3 pages).

English-language translation of International Search Report from the Japanese Patent Office in PCT International Application No. PCT/JP2012/061921 mailed Aug. 14, 2012.

* cited by examiner

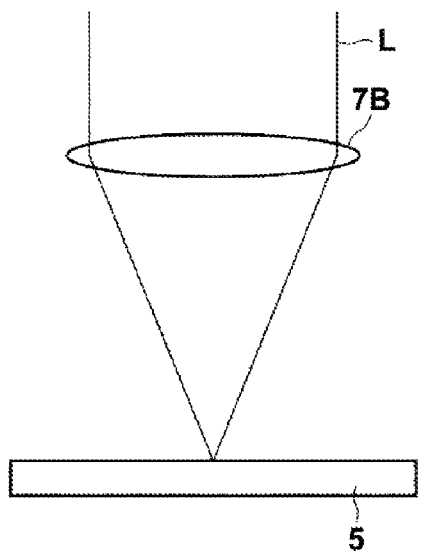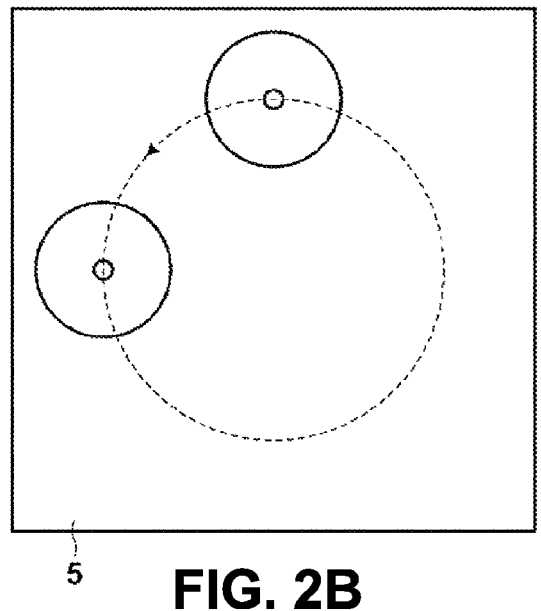
FIG. 2A    FIG. 2B

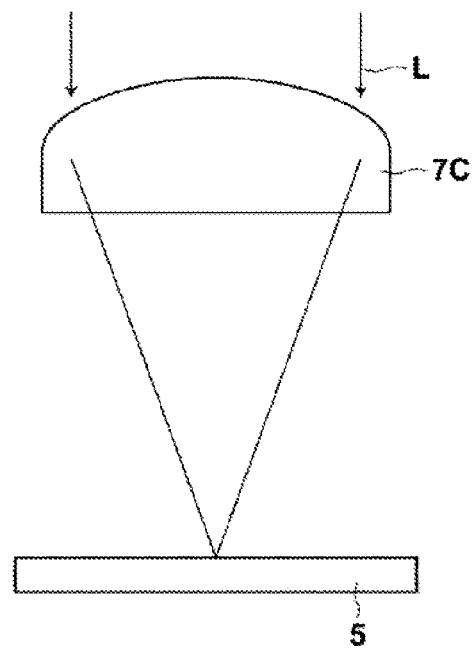
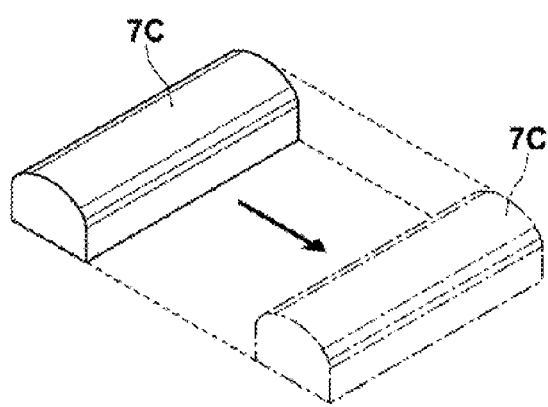
FIG. 4A                    FIG. 4B

LENS AND LASER PROCESSING APPARATUS EQUIPPED WITH THE LENS

BACKGROUND OF THE INVENTION

1. Field of the Invention

The present invention relates to a lens for laser processing of a material to be processed and a laser processing apparatus equipped with the lens, and more particularly, to a lens for processing a material to be processed into a member having an arbitrary shape having a closed curve and a laser processing apparatus equipped with the lens.

2. Background Art

Hitherto, a laser processing apparatus for processing a material to be processed such as a glass substrate into a member having an arbitrary shape by illumination of a laser light has been known.

For example, as the laser processing apparatus, a technique of forming a processing region having a desirable shape using a moving mechanism for moving a cylindrical lens or a moving mechanism for moving a stage on which a material to be processed is loaded is suggested in Japanese Unexamined Patent Application Publication No. 2010-158715 or Japanese Unexamined Patent Application Publication No. 2010-284712.

For example, when a processing shape is cat into an arbitrary shape having a closed curve such as a circle, a rounded rectangle, or a rounded triangle, the above-described laser processing apparatus needs to control a moving mechanism for moving a lens itself or a moving mechanism for moving the stage (support table) itself on which the material to be processed is loaded.

For example, when a circular member is cut, the following method is used. FIGS. 2A and 2B are diagrams illustrating a case where laser processing is performed by using a biconvex lens 7B according to an embodiment of the related art. As illustrated in FIG. 2A, a material to be processed 5 can be cut into a circular member by a laser light transmitted through the biconvex lens 7B. At this time, in order to cut the circular member from the material to be processed 5, as illustrated in FIG. 2B, the laser processing apparatus has to allow the laser light to illuminate the material to be processed 5 to draw a circle by moving the biconvex lens 7B in a circle. Otherwise, the laser processing apparatus fixes the biconvex lens 7B and moves the stage itself on which the material to be processed 5 is loaded in a circle to cut the circular member.

Therefore, time for the movement control or the laser processing is needed, a movement controller of the lens or a movement device of the material to be processed needs to be mounted, and thus there becomes a large scale problem in the entire apparatus.

In addition, a case where a convex cylindrical lens having a semicylinder shape illustrated in FIG. 3 is used instead of the biconvex lens is also the same as the above case. FIGS. 4A and 4E are diagrams illustrating a case where member processing is performed by a convex cylindrical lens 7C according to an embodiment of the related art. For example, when a rectangular member is cut, as illustrated in FIG. 4A, a material to be processed 5 is processed by a laser transmitted through the convex cylindrical lens 7C. At this time, in order to cut the rectangular member from the material to be processed 5, as illustrated in FIG. 4B, the convex cylindrical lens 7C is linearly moved. In addition, the laser processing apparatus allows the laser to illuminate the material to be processed 5 to draw a rectangle by moving the convex cylindrical lens 7C. Otherwise, the laser processing apparatus fixes the convex cylindrical lens 7C and moves the stage itself on which the material to be processed 5 is loaded in a rectangle or moves or rotates the stage to cut the rectangular member.

Therefore, similarly, time for the movement control or the laser processing is needed, a movement controller of the lens or a movement controller of the material to be processed needs to be mounted, and thus there becomes a large scale problem in the entire apparatus. Therefore, the present invention provides a lens which enables a reduction in time for laser processing and a reduction in size without an unnecessary movement controller being mounted in a laser processing apparatus, and a laser processing apparatus equipped with the lens.

SUMMARY OF THE INVENTION

According to an aspect of the present invention, a lens is mounted in a laser processing apparatus for processing a material to be processed into a member having an arbitrary shape having a closed curve. A convex cylindrical lens is molded to have a closed path so that a line that connects vertices of a cylindrical surface of the convex cylindrical lens has the same form as the arbitrary shape having the closed curve.

The "vertices" are the highest points of the cylindrical surface of the convex cylindrical lens.

"A line that connects vertices of a cylindrical surface of the convex cylindrical lens has the same form as the arbitrary shape having the closed curve" indicates that the shape of the member having the arbitrary shape having the closed curve which is to be processed by the laser processing apparatus has the same shape or substantially the same shape as the line that connects the vertices of the cylindrical surface of the convex cylindrical lens. For example, when the laser processing apparatus processes a circular member, the line that connects the vertices of the cylindrical, surface of the convex cylindrical lens is a circular shape. In addition, the line that connects the vertices of the cylindrical surface of the convex cylindrical lens may have a circular shape overall, and may also have a partial difference due to slight unevenness. In addition, when the laser processing apparatus processes the circular member, the line that connects the vertices of the cylindrical surface of the convex cylindrical lens may have a circular form and may not necessarily have the same size.

"To mold" refers to shaping a lens. Specifically, molding using a mold, molding by grinding, molding by etching, and the like may be employed.

"To process" refers to ousting the material to be processed into the member having the arbitrary shape having the closed curve. Specifically, the member having the arbitrary shape having the closed curve is cut. Otherwise, cutting the material to be processed into the shape of the member having the arbitrary shape having the closed curve may be employed.

According to another aspect of the present invention, a laser processing apparatus for processing a material to be processed into a member having an arbitrary shape having a closed curve, includes: a lens which is molded to allow a convex cylindrical lens to have a closed path so that a line that connects vertices of a cylindrical surface of the convex cylindrical lens has the same form as the arbitrary shape having the closed curve.

In the laser processing apparatus according to the above aspect of the present invention, the lens may be a hollow lens including: an incident surface portion which is formed in the cylindrical surface of the convex cylindrical lens and on which a light emitted from a light scarce is incident; an exit surface portion from which the light emitted from the light source exits; an outer surface portion which is positioned in outer surfaces of the incident surface portion and the exit surface portion; and a hollow surface portion which is positioned in inner surfaces of the incident surface portion and the exit surface portion.

In the laser processing apparatus according to the above aspect of the present invention, the lens may be provided with a light shielding plate in a hollow part of the hollow lens.

The "light shielding plate" causes the light from the light source not to be transmitted through the lens. For example, a film-shaped or thin plate-shaped light shielding plate may be employed. Specifically, a metal sheet may be employed. In addition, a metallic material may be applied to the lens.

The laser processing apparatus according to the above aspect of the present invention may control the light not to illuminate the hollow part of the hollow lens when the light from the light source illuminates the lens.

In the laser processing apparatus according to the above aspect of the present invention, the member having the arbitrary shape having the closed curve may be a circular member.

In the laser processing apparatus according to the aspect of the present invention, a light shielding material may be added to the lens so that, when a curvature of a predetermined part of the member having the arbitrary shape having the closed curve is high, the light from the light source is not guided to a region of substantially the half of the lens on the outer surface portion side in the incident surface or the exit surface.

According to the lens and the laser processing apparatus equipped with the lens according to the aspects of the present invention, since the lens which is used for processing the material to be processed into the member having the arbitrary shape having the closed curve and is molded to allow the convex cylindrical lens to nave the closed path so that the line that connects the vertices of the cylindrical surface of the convex cylindrical lens has the same form as the arbitrary shape having the closed curve is used, when the material to be processed is processed into the member having the arbitrary shape having the closed curve by laser processing, time for the laser processing can be reduced, and a reduction in the size of the laser processing apparatus itself can be achieved.

When the lens and the lens of the laser processing apparatus equipped with the lens according to the aspects of the present invention are the hollow lens including: the incident surface portion which is formed in the cylindrical surface of the convex cylindrical lens and on which the light emitted from the light source of the laser processing apparatus is incident; the exit surface portion from which the light emitted from the light source exits; the outer surface portion which is positioned in the outer surfaces of the incident surface portion and the exit surface portion; and the hollow surface portion which is positioned in the inner surfaces of the incident surface portion and the exit surface portion, the light from the light source can converge in a region where the member having the arbitrary shape having the closed carve to be subjected to the laser processing is processed.

When the lens and the lens of the laser processing apparatus equipped with the lens according to the aspects of the present invention are provided with the light shielding material in the hollow part of the hollow lens, the light from the light source may not be allowed, to illuminate regions other than the region where the member having the arbitrary shape having the closed curve to be subjected to the laser processing is processed.

When the lens and the laser processing apparatus equipped with the lens according to the aspects of the present invention control the light not to illuminate the hollow part of the hollow lens when the light from the light source illuminates the lens, light energy from the light source of the laser processing apparatus can efficiently illuminate the member having the arbitrary shape having the closed curve to be subjected to the laser processing.

When the light shielding material is added to the lens and the lens of the laser processing apparatus equipped with the lens according to the aspects of the present invention so that, when the curvature of the predetermined part of the member having the arbitrary shape having the closed curve is high, the light from the light source is not transmitted through the region of substantially the half of the lens on the outer surface portion side in the incident surface portion or the exit surface portion, the light from the light source can be allowed not to be emitted to parts other than the predetermined part having the high curvature.

BRIEF DESCRIPTION OF THE DRAWINGS

FIGS. 2A and 2B are diagrams illustrating laser processing by a biconvex lens in an embodiment of the related art.

FIGS. 4A and 4B are diagrams illustrating laser processing by a convex cylindrical lens in an embodiment of the related art.

DETAILED DESCRIPTION OF THE INVENTION

A laser processing apparatus according to an embodiment of the present invention will be described with reference to the drawings.

Figure 1:
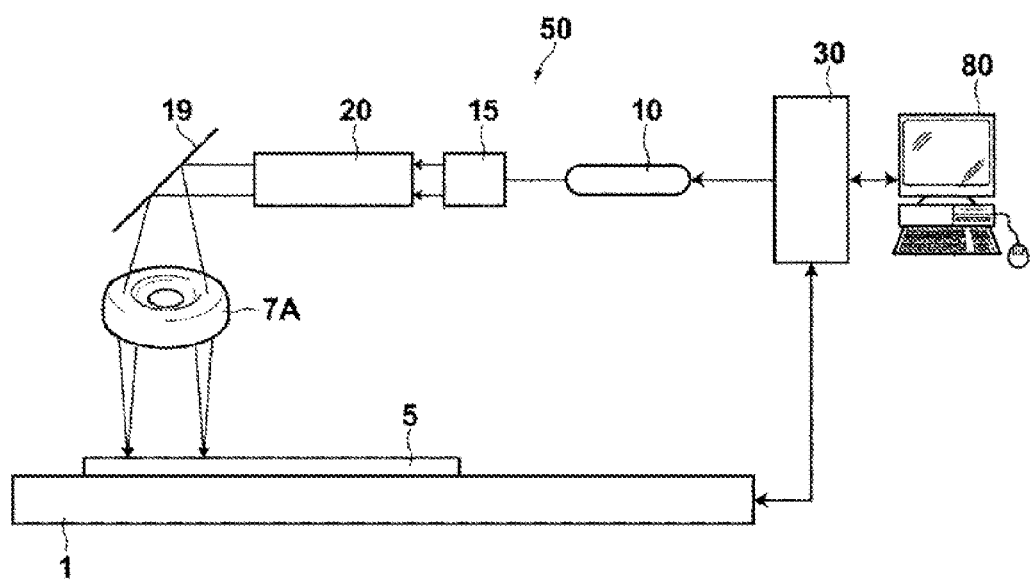
FIG. 1 is a diagram illustrating a laser processing apparatus in an embodiment of the present invention.
Figure 3:
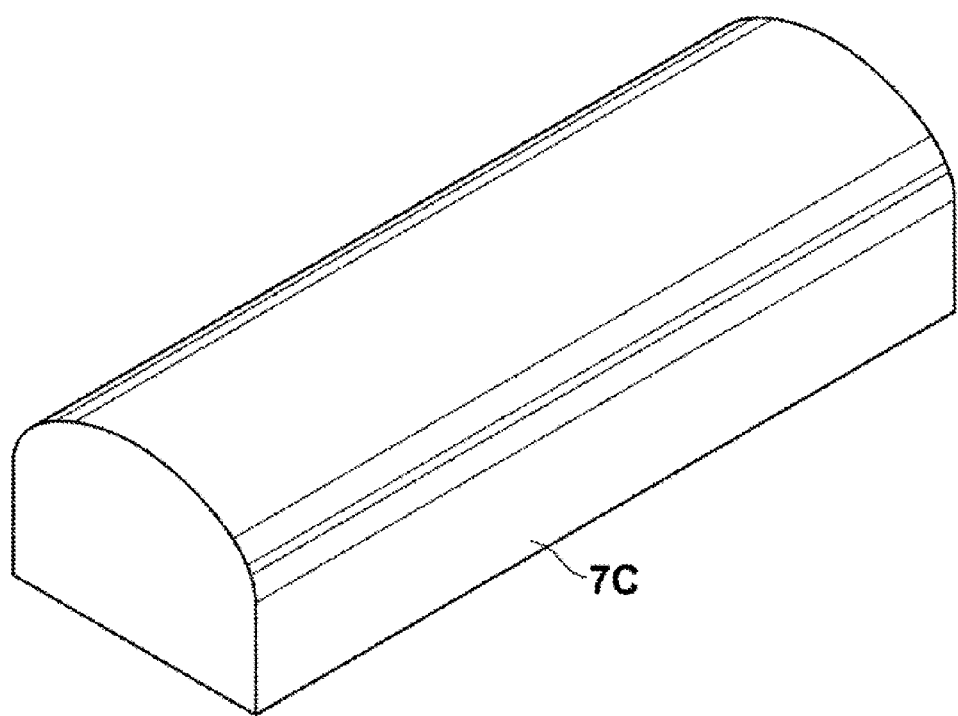
FIG. 3 is a diagram illustrating an example of a convex cylindrical lens.

FIG. 1 is a diagram schematically illustrating a laser processing apparatus 50 of the embodiment of the present invention. The laser processing apparatus 50 outs a member having an arbitrary shape having a closed curve by illuminating a material to be processed 5 made of glass with a laser light. The laser processing apparatus 50 includes a stage 1, the material to be processed 5 which is set on the stage 1, a laser light source 10, a beam expander 15, a reflecting mirror 19, a homogenising device 20, a circular lens 7A, a controller 30, and a personal computer 80 (hereinafter, referred to as a PC 80).

The laser light source 10 emits the laser light. The beam expander 15 enlarges the diameter of the laser light emitted from the laser light source 10 to be emitted. In addition, the homogenising device 20 allows the laser light with the enlarged diameter to be subjected to multiple reflections so as to be homogenized and emitted, and examples thereof include a rod lens and a light pipe. The circular lens 7A transmits laser light reflected by the reflecting mirror 19. The controller 30 controls the output of the light source 10, the position of the stage 1, and the like.

Here, a lens according to the embodiment of the present invention will be described in detail. The specific lens according to the embodiment of the present invention is mounted in the laser processing apparatus 50 which processes the material to be processed 5 into the member having the arbitrary shape having the closed curve, and a convex cylindrical lens is molded to have a closed path so that a line that connects vertices of a cylindrical surface of the convex cylindrical lens has the same form as the arbitrary shape having the closed curve.

Figure 5A:
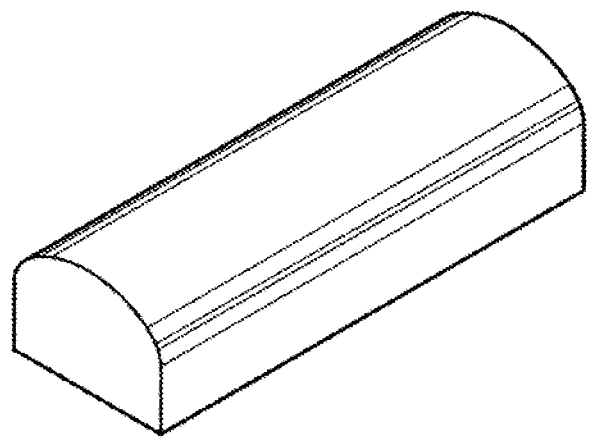
FIGS. 5A to 5C are diagrams illustrating a circular lens molded in the embodiment of the present invention.
Figure 5B:
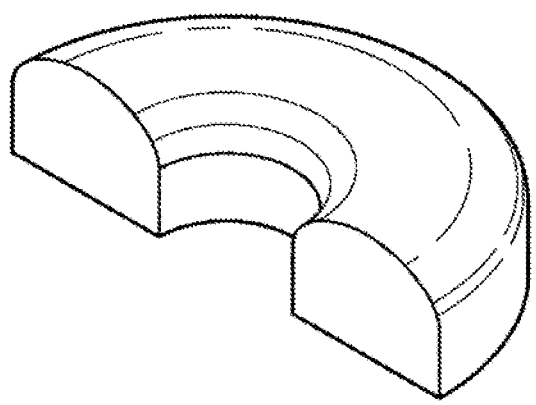
Figure 5C:
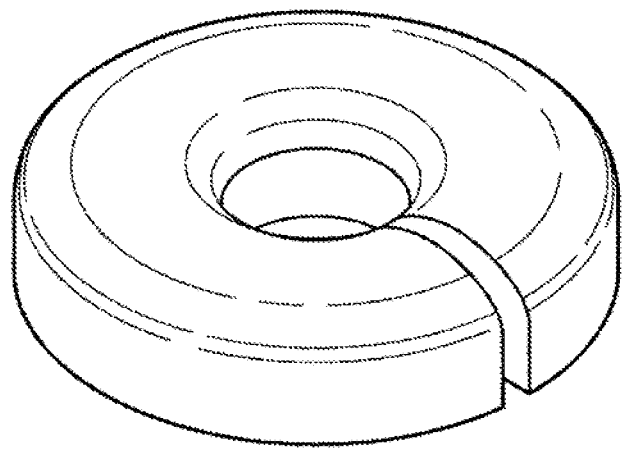

The circular lens 7A will be described as an example of the lens in the embodiment of the present invention. FIGS. 5A to 5C are diagrams illustrating the structure of the circular lens 7A. FIGS. 5A to 5C do not illustrate a manufacturing process of the circular lens 7A but simply illustrate a final form of the circular lens 7A.

The circular lens 7A is molded, so that the line that connects the vertices of the cylindrical surface of the convex cylindrical lens illustrated in FIG. 5A becomes a circular shape. The convex cylindrical lens of FIG. 5A is deformed to draw a semicircle as illustrated in FIG. 5B and then, draw substantially a circle as illustrated in FIG. 5C. Last, the convex cylindrical lens is formed to have the closed path so that the line that connects the vertices of the cylindrical surface of the convex cylindrical lens is arranged in a circle.

The specific lens (the circular lens, a triangular lens which will, be described later, or the like) in the embodiment of the present invention is molded, for example, using a mold. Otherwise, the lens may be molded by grinding, or may be molded by etching.

Figure 6:
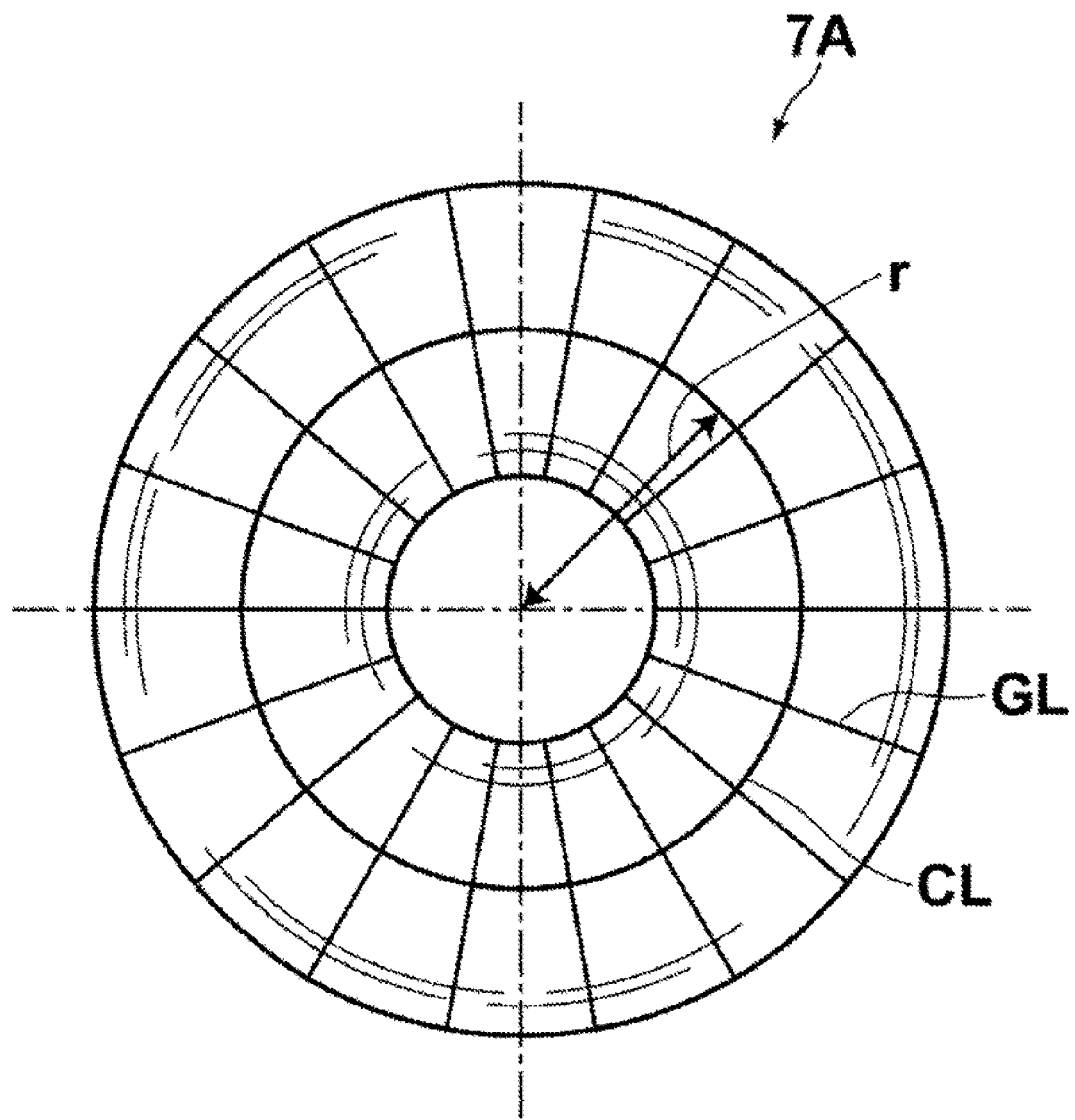
FIG. 6 is a plan view of the circular lens in the embodiment of the present invention.

The specific lens (the circular lens, a triangular lens which will be described later, or the like) in the embodiment of the present invention may be manufactured by any method as long as the lens is finally formed in a desirable shape. FIG. 6 is a plan view of the circular lens 7A. As illustrated in FIG. 6, the line that connects the vertices of the cylindrical surface, which correspond to respective center points (vertices of the cylindrical surface) of lines GL perpendicular to the cylindrical surface from the center of the convex cylindrical lens, made circular, and thus the material to be processed 5 can be processed into a circular member having a radius r.

Figure 7:
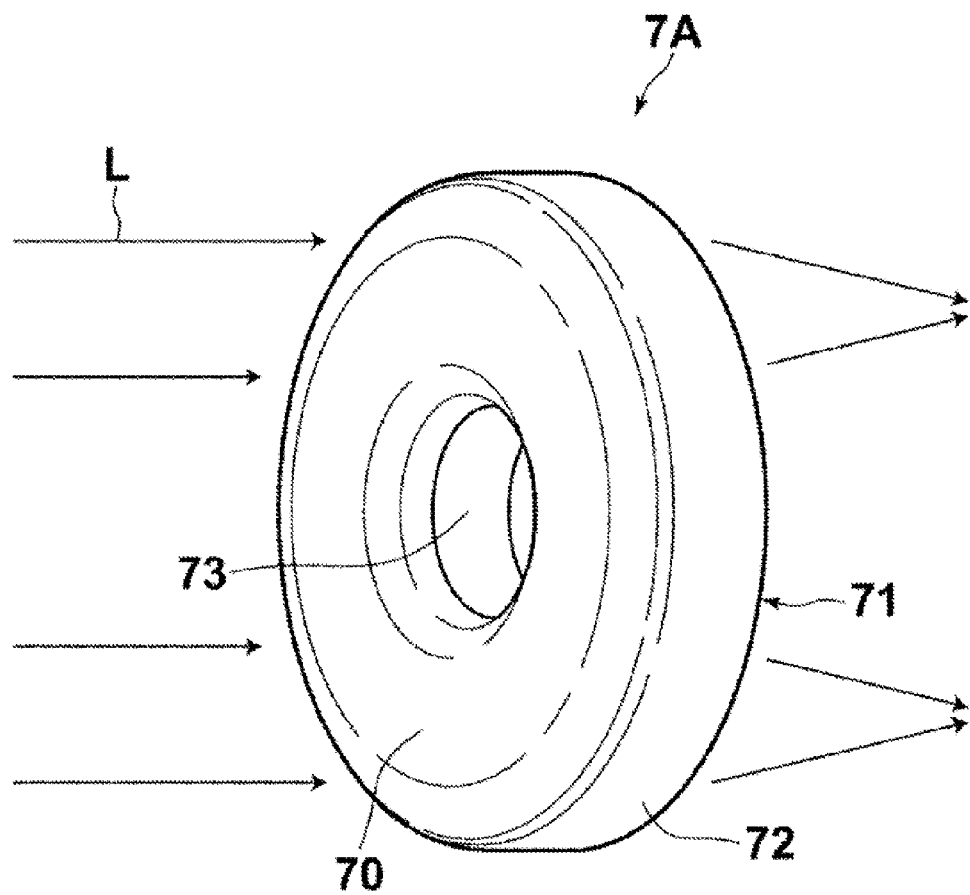
FIG. 7 is a diagram illustrating a relationship with a laser which is incident on and exits from the circular lens in the embodiment of the present invention.

FIG. 7 is a diagram illustrating a relationship with the laser light L which is incident on and exits from the circular lens 7A. The circular lens 7A is a hollow lens including: an incident surface portion 70 which is formed in the cylindrical surface of the convex cylindrical lens and on which the light emitted from the light source 10 of the laser processing apparatus 50 is incident; an exit surface portion 71 from which the light emitted from the light source exits; an outer surface portion 72 which is positioned in the outer surfaces of the incident surface portion 70 and the exit surface portion 71; and a hollow surface portion 73 which is positioned in the inner surfaces of the incident surface portion 70 and the exit surface portion 71. The hollow surface portion 73 is a side surface part on the inside of the circular lens as illustrated in FIG. 7.

The laser processing apparatus 50 emits the laser light from the light source 10 to be incident on the incident surface portion 70 and to exit from the exit surface portion 71 in the circular lens 7A mounted. Therefore, the laser processing apparatus 50 can process the circular member having substantially the same radius as the radius r (for example, a length that connects the center lines of the lines GL from the center of the lens) of the circular lens 7A illustrated in FIG. 6 through laser processing. For example, when the material to be processed is made of glass, the laser processing apparatus 50 can cut the circular member through the laser processing. Specifically, the laser processing apparatus 50 can easily cut a glass for protection of a cellphone or a portable electronic device into the circular shape. In addition, the material to be processed may be plastic, silicon, or other materials for a substrate as well as glass.

Figure 8:
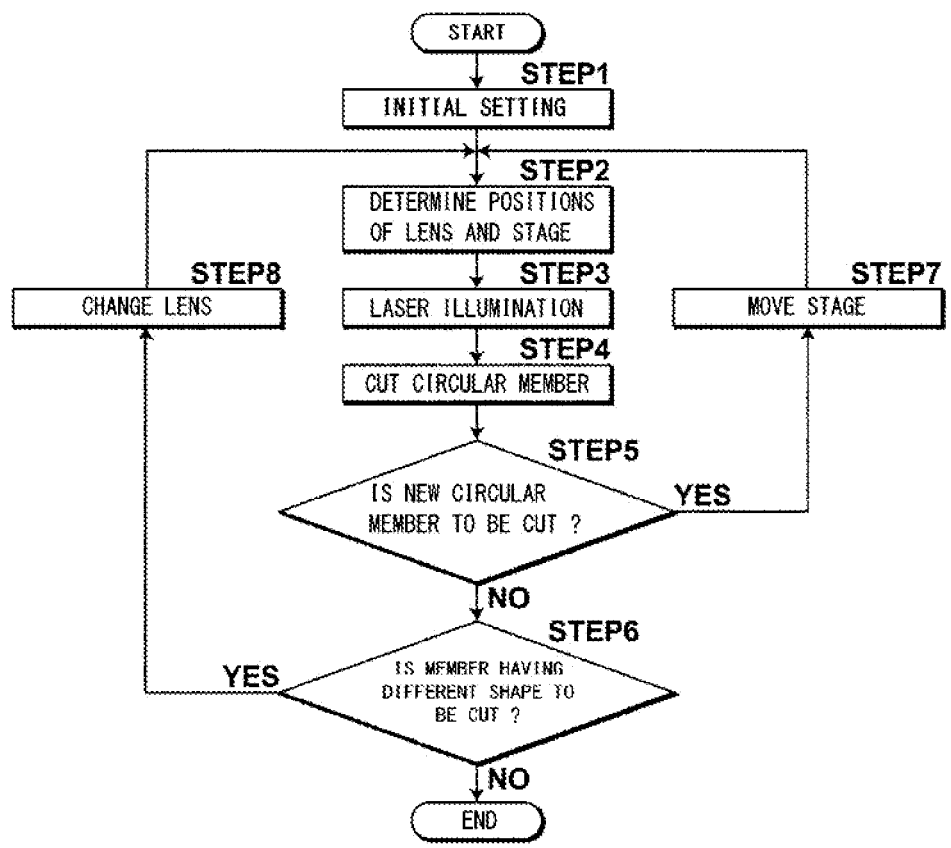
FIG. 8 is a diagram illustrating a series of processes in the embodiment of the present invention.

Next, a laser processing process in the laser processing apparatus 50 having the above configuration will be described. FIG. 8 is a flowchart illustrating a series of processes for processing the member of the laser processing apparatus.

First, an operator performs initial setting via the PC 80 (Step 1). Specifically, the operator inputs instruction information to the PC 80 to set an output level of the light from the light source 10 depending on the material of the material to be processed 5. In addition, the operator inputs instruction information to the PC 80 to move the position of the stage 1 on which the material to be processed 5 is installed. The operator may perform the initial setting by inputting the instruction information to the PC 80, but the PC 80 may perform initial setting through automatic processing and automatically generate the instruction information of the PC 80.

Subsequently, the controller 30 controls timing of laser illumination of the light source 10 or movement of the stage 1 on the basis of the instruction information commanded by the PC 80 (Step 2).

The light source 10 emits the laser light on the basis of the control of the controller 30 (Step 3), the diameter of the laser light emitted from the light source 10 is enlarged by the beam, expander 15, and the luminance distribution of the laser light is homogenized by the homogenizing device 20. In addition, the laser light is reflected by the reflecting mirror 19 and is thus incident on the circular lens 7A.

Figure 9:
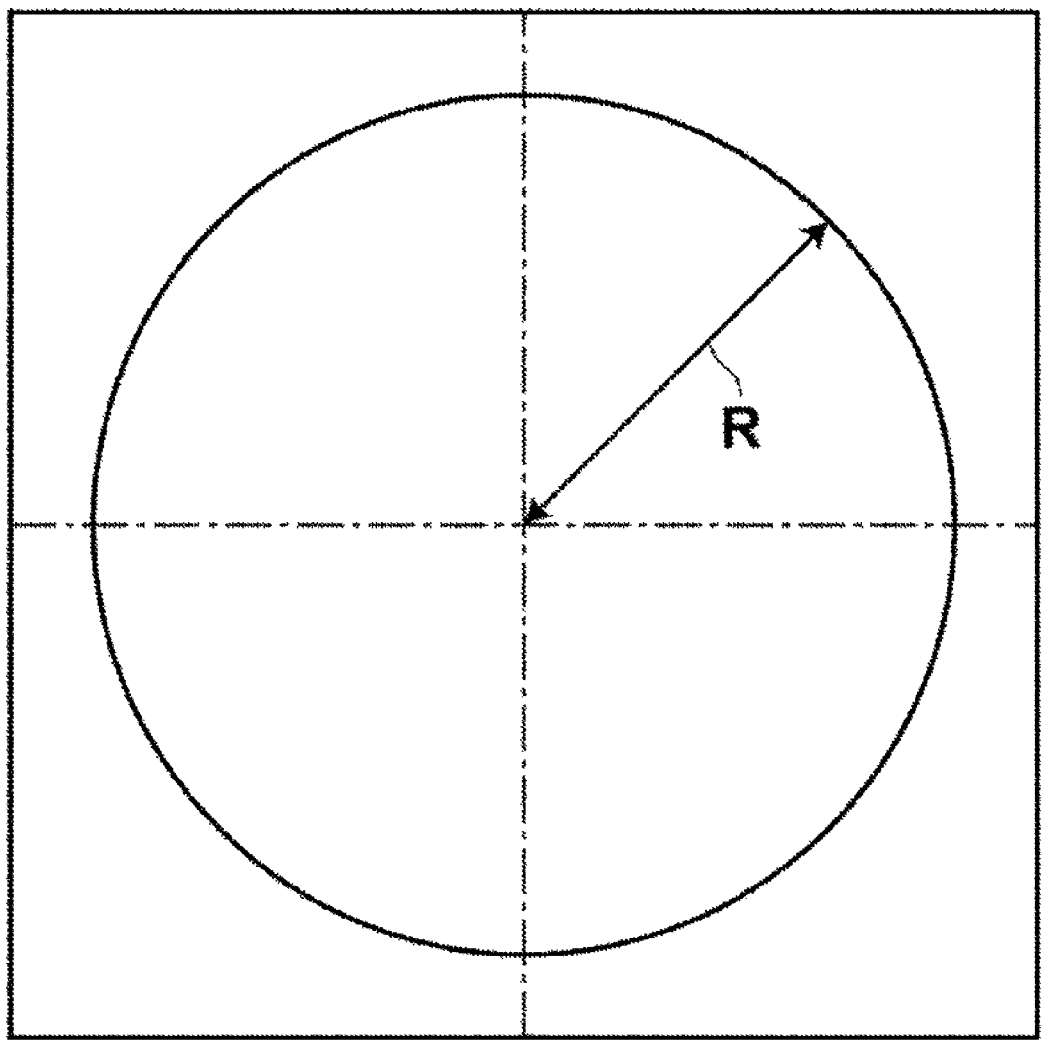
FIG. 9 is a diagram illustrating the result of convergence of a light which is transmitted through the circular lens in the embodiment of the present invention.

As illustrated in FIG. 7, the laser light which is incident on the incident surface portion 70 of the circular lens 7A is converged to cut the circular member. The laser processing apparatus 50 performs the cutting of the circular member (Step 4). As illustrated, in FIG. 6, the laser processing apparatus 50 allows the laser light to be converted in the circular shape having the radius r with respect to the center and the outer periphery of the circular lens 7A, thereby cutting the material to be processed 5 into the circular member having a radius R (r=R, or r≈R) as illustrated in FIG. 9.

Figure 10:
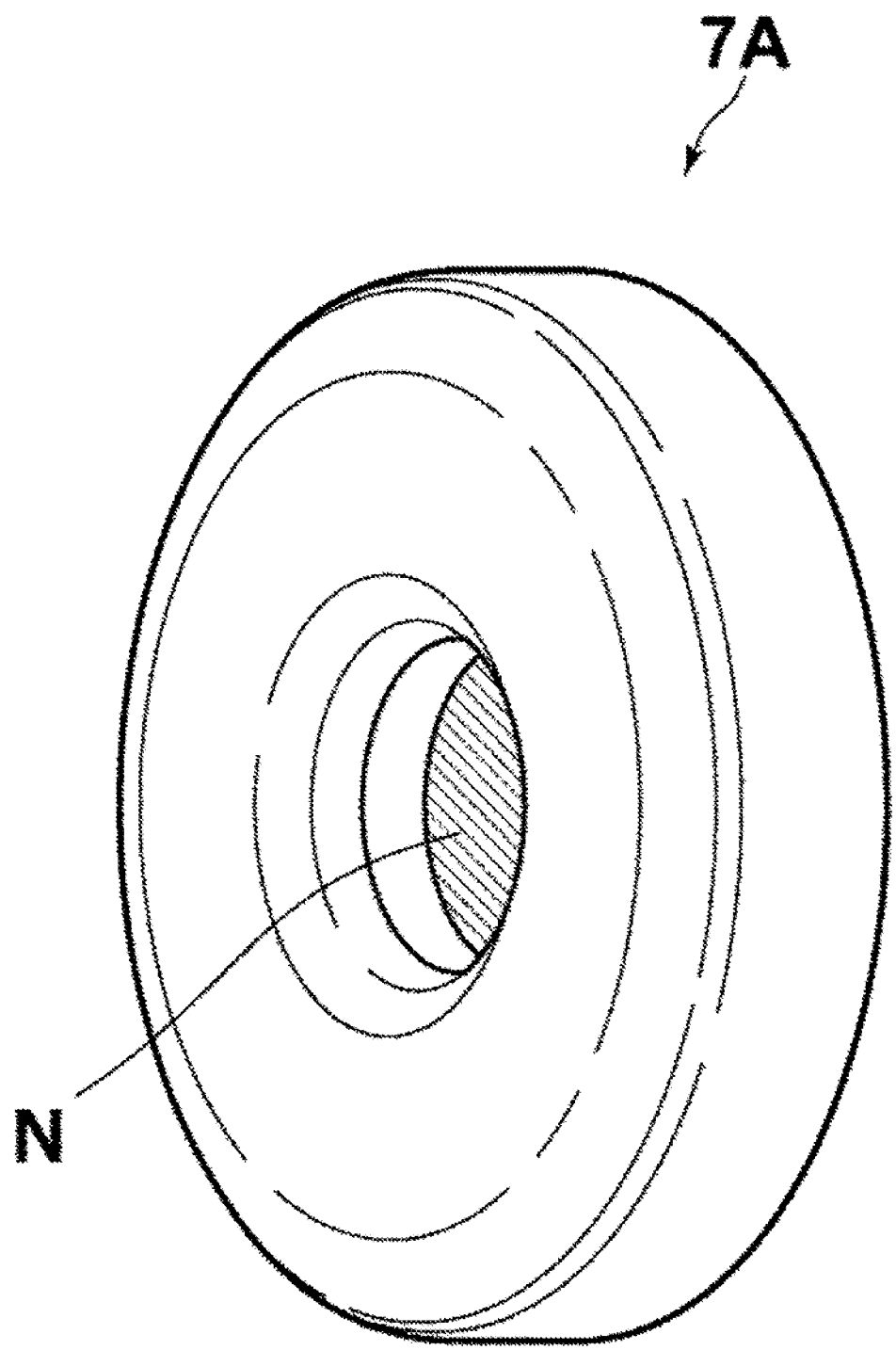
FIG. 10 is a diagram illustrating the circular lens to which a light shielding material is added in the embodiment of the present invention.
Figure 11:
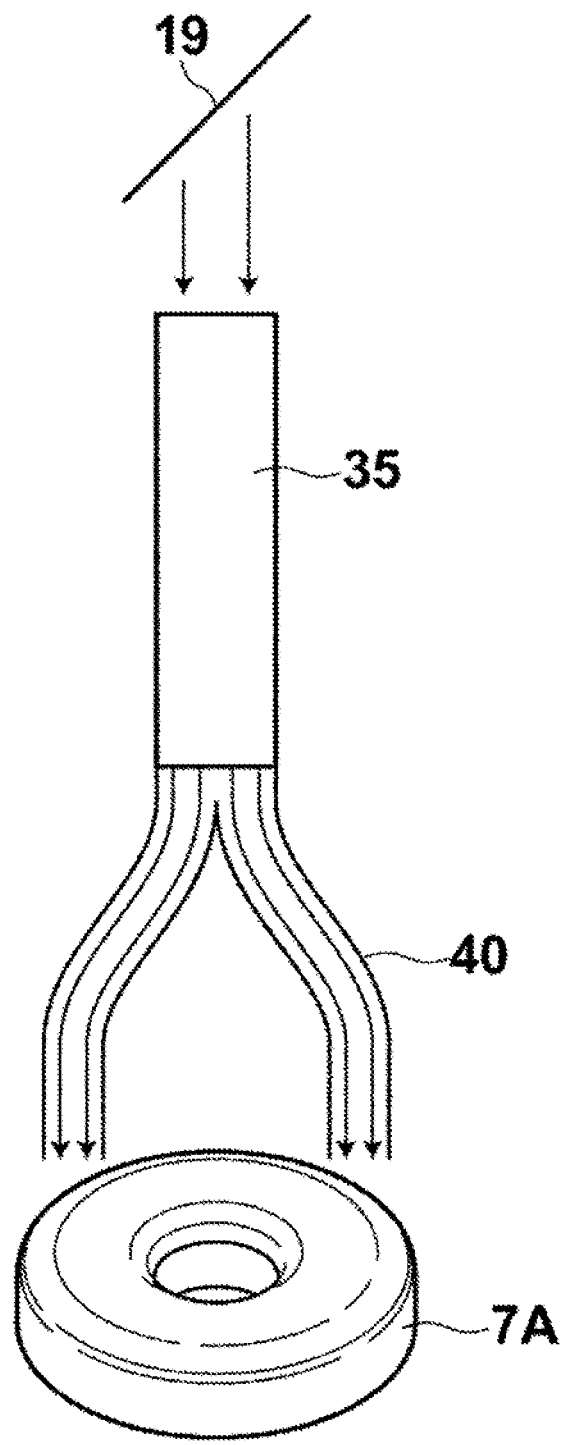
FIG. 11 is a system diagram illustrating control of a light which is incident on the circular lens in the embodiment of the present invention.

In addition, as illustrated in FIG. 10, in the circular lens 7A, a light shielding plate N having a light shielding material may be attached to a hollow part of the lens. The light shielding plate N having the light shielding material causes the laser light from the light source not to be transmitted through the lens. For example, a film-shaped or thin plate-shaped light shielding plate may be employed. Specifically, a metal sheet may be employed. In addition, a lens may be inserted into the hollow surface portion 73 of the circular lens 7A. In this case, the light shielding plate N may be made by applying a metallic material to the lens.

In addition, when the laser light from the light source illuminates the lens, the laser processing apparatus 50 may control the light not to illuminate the hollow part of the hollow lens. Specifically, the laser processing apparatus 50 includes a light guide path 35 which guides the laser light reflected by the reflecting mirror 19 and an optical fiber 40 which causes the laser light to be incident only on the incident surface portion 70 of the circular lens 7A, and thus can control the laser light to be incident only on the incident surface portion 70 of the circular lens 7A. Accordingly, the laser processing apparatus 50 can control the laser light not to illuminate the hollow surface portion 73 of the circular lens 7A. For example, in order for the laser light to be incident only on the incident surface portion 70 of the circular lens 7A, by optimally arranging the reflecting mirror and other mirrors, the laser processing apparatus 50 can control the laser light not to illuminate the hollow surface portion 73.

Here, returning to the description of the flowchart illustrated in FIG. 8, the controller 30 determines whether or not to cut a new circular member from the material to be processed 5 from which the circular member is cut. When the new circular member is cut (Yes in Step 5), the controller 30 moves the stage 1 to move the material to be processed 5 to a desirable position to be cut into the new circular member (Step 7). An image processing function installed in the PC 80 mounted, in the laser processing apparatus 50 can recognize and process a position marked on the material to be processed 5, and according to the recognition result, the controller 30 may automatically move the stage. When the new circular member is not cut (No in Step 5), the controller 30 determines whether or not a member having a different shape is to be cut.

When the member having the different shape is cut from the material to be processed 5 (Yes in Step 6), the lens may be changed. In addition, the lens may be changed to a lens other than the circular lens 7A (Step 8). On the other hand, when the member having the different shape is not cut from the material to be processed 5 (No in Step 6), the process is completed.

The laser processing apparatus 50 may be configured to have a lens changing device (not illustrated) and change the lens to a lens other than the circular lens 7A as described above. For example, the laser processing apparatus 50 may include a triangular lens 7D as illustrated in FIG. 12.

Figure 12:
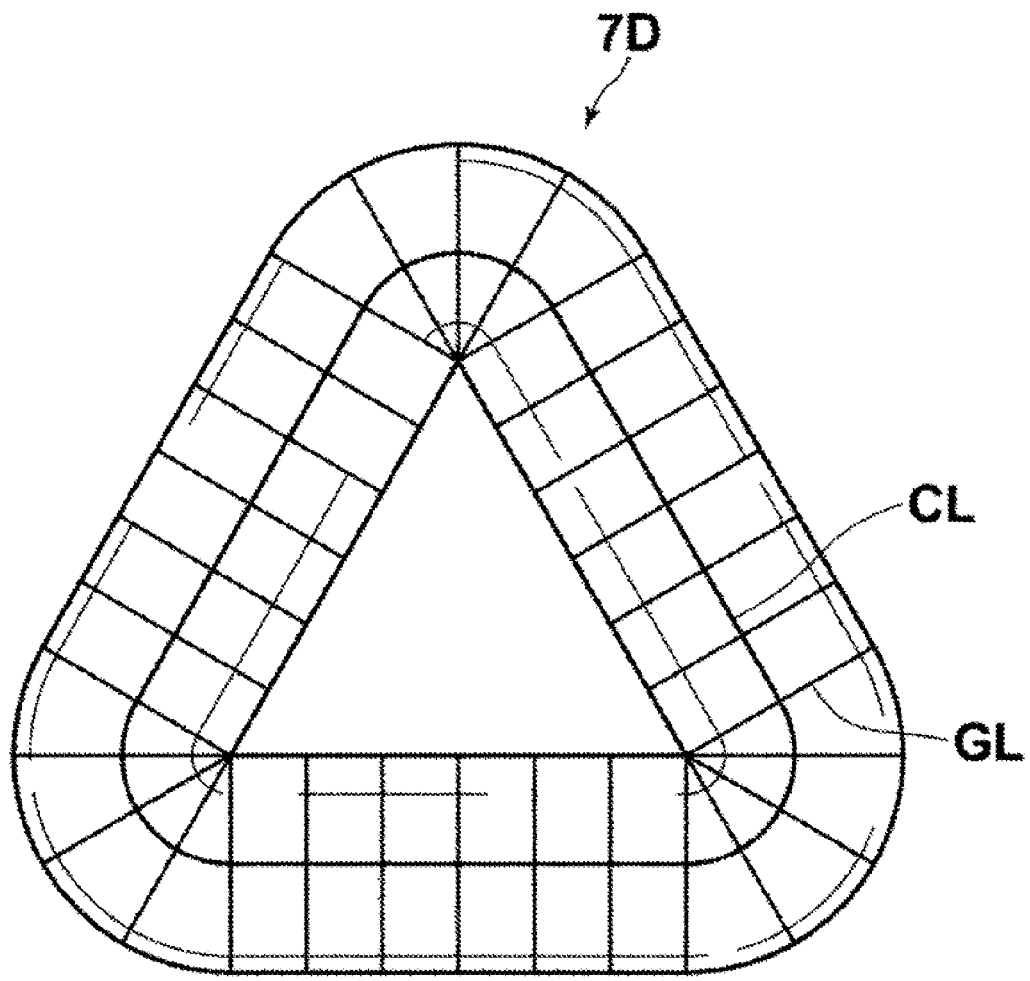
FIG. 12 is a diagram illustrating a triangular lens molded in the embodiment of the present invention.

FIG. 12 is a diagram illustrating the structure of the triangular lens 7D. As illustrated in FIG. 12, the triangular lens 7D is a triangular member having a closed curve. The triangular lens 7D is molded so that a line CL that connects vertices of a cylindrical surface of a convex cylindrical lens is arranged in a triangular shape. As illustrated in FIG. 12, the convex cylindrical lens is formed to have the closed path so that the line CL chat connects the vertices of the cylindrical surface, which correspond to respective center points (vertices of the cylindrical surface) of lines GL perpendicular to the cylindrical surface from the center of the convex cylindrical lens, is triangular. FIG. 12 is a plan view of the triangular lens 7D. By molding the vertices of the cylindrical surface of the convex cylindrical lens to have the triangular shape, the material to be processed 5 can be cut into a triangular member.

Figure 13:
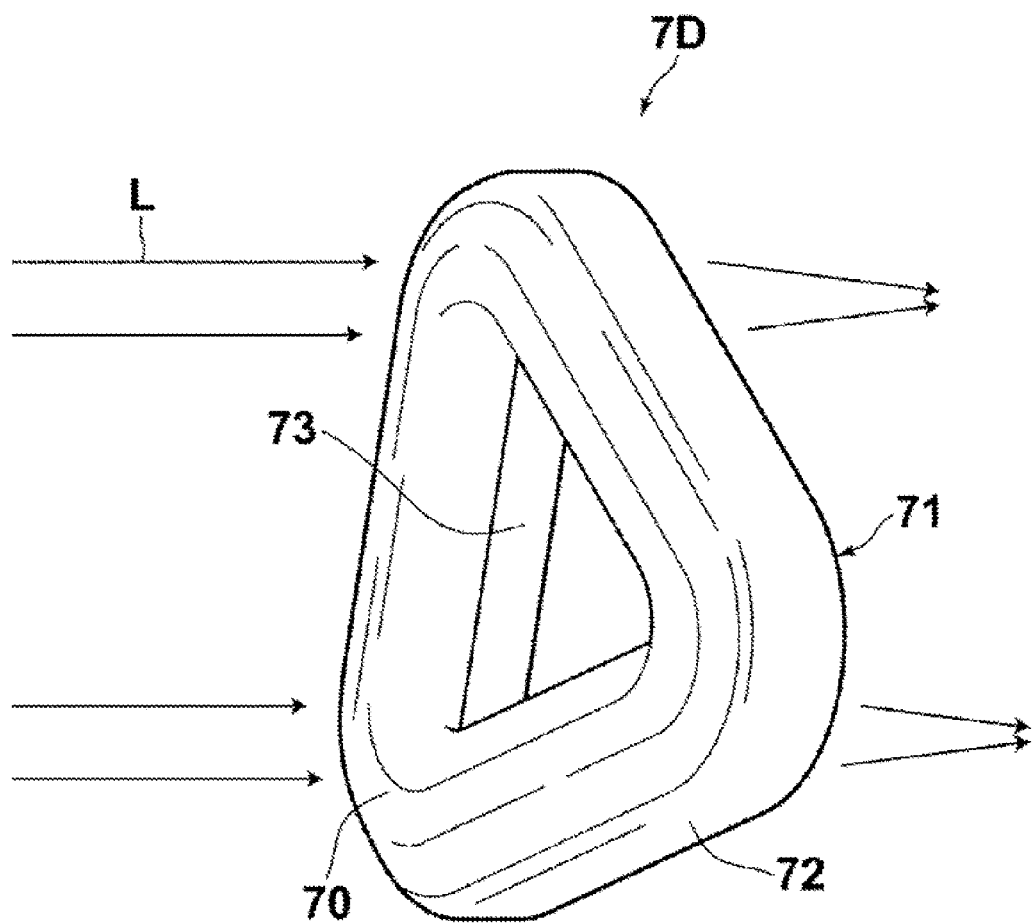
FIG. 13 is a diagram, illustrating a relationship with a light which is incident on and exits from the triangular lens in the embodiment of the present invention.

FIG. 13 is a diagram illustrating a relationship with the laser light which is incident on and exits from the triangular lens 7D. The triangular lens 7D is a hollow lens including: an incident surface portion 70 which is formed in the cylindrical surface of the convex cylindrical lens and on which the laser light emitted from, the light source 10 of the laser processing apparatus 50 is incident; an exit surface portion 71 from which the light emitted from the light source exits; an outer surface portion 72 which is positioned in the outer surfaces of the incident surface portion 70 and the exit surface portion 71; and a hollow surface portion 73 which is positioned in the inner surfaces of the incident surface portion 70 and the exit surface portion 71.

The laser processing apparatus 50 allows the laser light from the light source 10 to be transmitted through the incident surface portion 70 of the triangular lens 7D, transmitted through the exit surface portion 71, and then converged and thus process the triangular member having the same shape as that of the line CL of the triangular lens 7D illustrated in FIG. 12 through laser processing. For example, when the material of the material to be processed is glass, the laser processing apparatus 50 can cut the triangular member through the laser processing. For example, the laser processing apparatus 50 can easily cut a glass for protection of a cellphone or a portable electronic device into the triangular shape.

Figure 14:
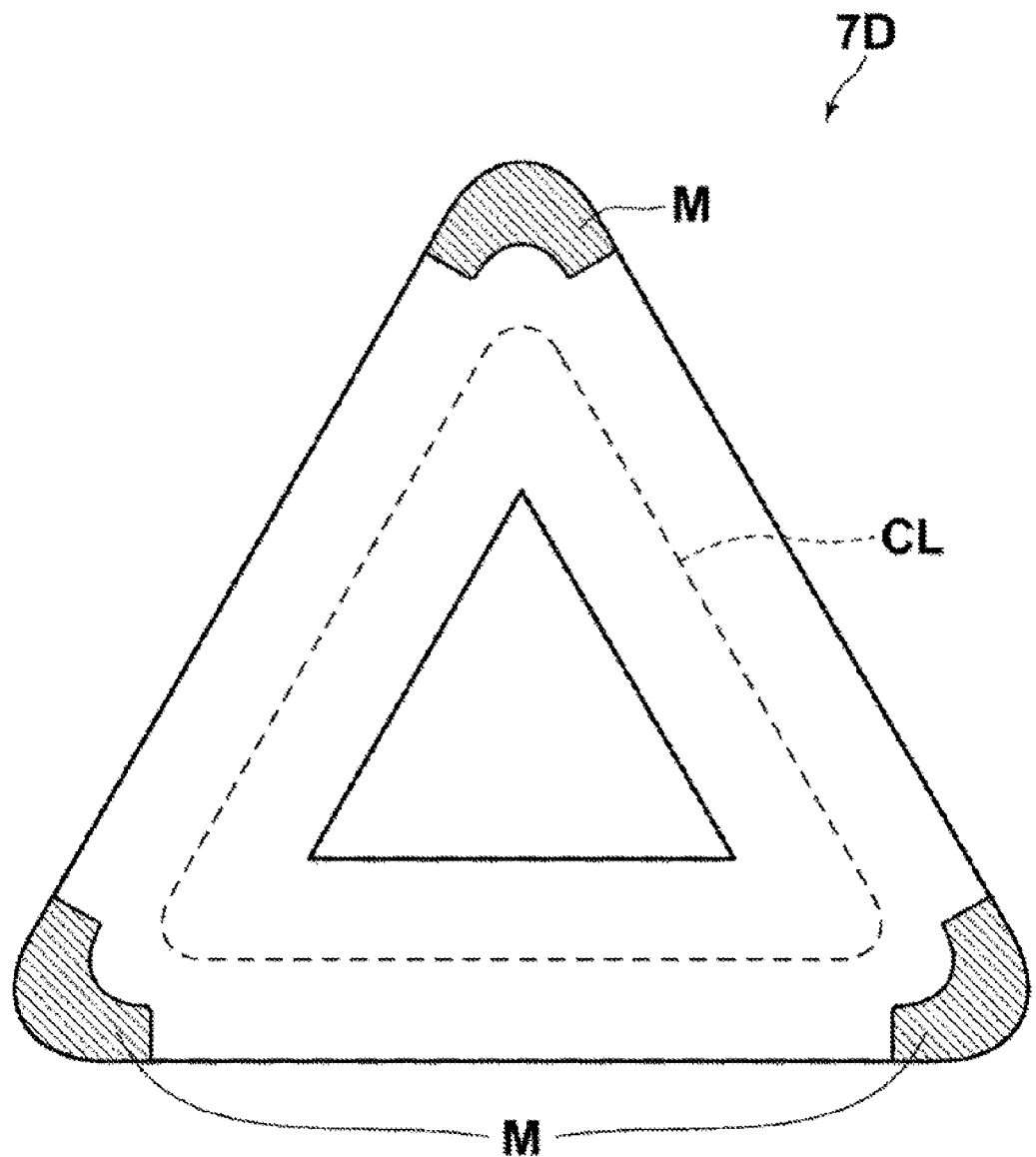
FIG. 14 is a diagram illustrating the triangular lens to which the light shielding material is added in the embodiment of the present invention.

The light shielding material may be added to the lens of the laser processing apparatus 50 so that, when the curvature of a predetermined part of the member having the arbitrary shape having the closed curve is high, the light from, the light, source is not guided to a region of the predetermined part positioned on the outer surface portion 72 side in the incident surface portion 70 or the exit surface portion 71. For example, as illustrated in FIG. 14, when the curvatures or three points such as the corners of the triangular lens 7D are high, the light shielding material M is added to the desirable regions of the parts which are positioned on the outer surface portion 72 side in the incident surface portion 70 or the exit surface portion 71 and have the high curvatures so as not to guide the light from the light source 10 to the desirable regions. The light from the light source 10 may not be allowed to exit from the lens by the light, shielding material M. In addition, the light shielding material may be added to a region of a part having a high curvature of a star-shaped lens, a heart-shaped lens, an S-shaped lens, or a lens having another shape other than the above-described triangular lens.

In addition, like the circular lens 7A, the light shielding material M may be provided in the hollow surface portion 73 of the triangular lens 7D.

The laser processing apparatus 50 includes the lens changing device (not illustrated), and thus can cut the material to be processed 5 into the triangular member by changing the lens to the triangular lens 7D. In addition, the laser processing apparatus 50 may use the star-shaped lens, the heart-shaped lens, the S-shaped lens, or the lens having another shape other than the circular lens and triangular lens described above.

In addition, the laser processing apparatus 50 may only include any of the circular lens 7A and the triangular lens 7D without the lens changing device (not illustrated).

According to the lens and the laser processing apparatus 50 equipped with the lens in the embodiment of the present invention, since the lens is used which is molded to cause the convex cylindrical lens to have the closed path so that the line that connects the vertices of the cylindrical surface of the convex cylindrical lens has the same form as the arbitrary shape having the closed curve, when the material to be processed is processed into the member having the arbitrary shape having the closed curve through the laser processing, time for the laser processing is reduced. In addition, when the laser processing apparatus 50 processes the member having the arbitrary shape having the closed curve through the laser processing, a mechanism for rotating and moving the lens or a mechanism for rotating and moving the stage 1 does not need to be provided and thus a reduction in the size of the laser processing apparatus itself can be achieved.

When the lens and the lens of the laser processing apparatus 50 equipped with the lens in the embodiment of the present invention are the hollow lens including: the incident surface portion 70 which is formed in the cylindrical surface of the convex cylindrical lens and on which the light emitted from the light source of the laser processing apparatus 50 is incident; the exit surface portion 71 from which the light emitted from the light source exits; the outer surface portion 72 which is positioned in the outer surface of the incident surface portion 70 and the exit surface portion 71; and the hollow surface portion 73 which is positioned in the inner surface of the incident surface portion 70 and the exit surface portion 71, the light from the light source can converge in the region where the member having the arbitrary shape having the closed curve to be subjected to the laser processing is processed.

When the lens and the lens of the laser processing apparatus 50 equipped with the lens in the embodiment of the present invention are provided with the light shielding plate in the hollow part of the hollow lens, the light from the light source can be caused not to illuminate regions other than the region where the member having the arbitrary shape having the closed curve to be subjected to the laser processing is processed.

When the lens and the laser processing apparatus 50 equipped with the lens in the embodiment of the present invention control the light not to illuminate the hollow part of the hollow lens when the light from the light source illuminates the lens, light energy from the light source of the laser processing apparatus can efficiently illuminate the member having the arbitrary shape having the closed curve to be subjected to the laser processing.

When the light shielding material is added to the lens and the lens of the laser processing apparatus 50 equipped with the lens in the embodiment of the present invention so that, when the curvature of the predetermined part of the member having the arbitrary shape having the closed curve is high, the light from the light source is not guided to the region of the predetermined part positioned on the outer surface portion side in the incident surface portion or the exit surface portion, the light from the light source can be allowed not to converge on parts other than the predetermined part having the high curvature. For example, as illustrated in FIG. 14, when the curvatures of the three points such as the corners of the triangular lens 7D are high, the light shielding material M is added to the desirable regions of the parts which are positioned on the outer surface portion 72 side in the incident surface portion 70 or the exit surface portion 71 and have the high curvatures so as not to guide the light from the light source to the desirable regions. The light from the light source 10 may not be allowed to exit from the lens by the light shielding material M. In addition, the light shielding material may be added to a region of a part having a high curvature of a star-shaped lens, a heart-shaped lens, an S-shaped lens, or a lens having another shape other than the above-described triangular lens.

What is claimed is:

1. A lens which is mounted in a laser processing apparatus for processing a material to be processed into a member including an arbitrary shape having a closed curve, the lens comprising:
    a convex cylindrical lens body molded to have a closed path so that a line that connects vertices of a cylindrical surface of the convex cylindrical lens body has the same form as the arbitrary shape having the closed curve;
    a hollow part in the convex cylindrical lens body, the hollow part having the same shape as the arbitrary shape; and
    a light shielding material disposed on an outer surface portion side in an incident surface portion or an exit surface portion of the convex cylindrical lens body where a curvature of a predetermined part of the convex cylindrical lens body including the arbitrary shape having the closed curve is high, so that a light from a light source is not guided through a region of the predetermined part.

2. A laser processing apparatus for processing a material including an arbitrary shape having a closed curve, comprising:
    a lens which is molded to include:
        a convex cylindrical lens body having a closed path so that a line that connects vertices of a cylindrical surface of the convex cylindrical lens body has the same form as the arbitrary shape having the closed curve;
        a hollow part in the convex cylindrical lens body, the hollow part having the same shape as the arbitrary shape; and
        a light shielding material disposed on an outer surface portion side in an incident surface portion or an exit surface portion of the convex cylindrical lens body where a curvature of a predetermined part of the convex cylindrical lens body including the arbitrary shape having the closed curve is high, so that a light from a light source is not guided through a region of the predetermined part.

3. The laser processing apparatus according to claim 2, wherein the lens is a hollow lens including:
    the incident surface portion which is formed in the cylindrical surface of the convex cylindrical lens body and on which the light emitted from the light source of the laser processing apparatus is incident;
    the exit surface portion from which the light emitted from the light source exits;
    the outer surface portion which is positioned in outer surfaces of the incident surface portion and the exit surface portion; and
    a hollow surface portion which is positioned in inner surfaces of the incident surface portion and the exit surface portion.

4. The laser processing apparatus according to claim 3, wherein the lens is provided with a light shielding plate in the hollow part of the hollow lens.

5. The laser processing apparatus according to claim 3, wherein the laser processing apparatus controls the light not to illuminate the hollow part of the hollow lens when the light from the light source illuminates the lens.

6. The laser processing apparatus according to any one of claims 2 to 5,
    wherein the material including the arbitrary shape having the closed curve is a circular member.

7. The laser processing apparatus according to any one of claims 2 to 5,
    wherein the laser processing apparatus cuts the material to be processed into the member having the arbitrary shape having the closed curve.

8. A lens configured for mounting in a laser processing apparatus for processing a material into a member including a predetermined shape having a closed curve, the lens comprising:
    a convex cylindrical lens body having a cylindrical surface and a closed curve, a line that connects vertices of the cylindrical surface forming the same predetermined shape as the member,
    wherein the cylindrical surface includes an incident surface portion on which a light emitted from a light source is incident, and an exit surface portion from which the light incident on the incident surface portion exits the convex cylindrical lens body, and a light shielding material disposed on at least one of the incident surface portion and the exit surface portion at at least one portion of the convex cylindrical lens body where a curvature of the predetermined shape formed by the line is high, the light shielding material blocking the light so that the light is not guided through the at least one portion of the convex cylindrical lens body.

* * * * *